United States Patent [19]
Lee et al.

[11] Patent Number: 5,874,006
[45] Date of Patent: Feb. 23, 1999

[54] ASEPTIC COLLAGEN CONCENTRATION PROCESS

[75] Inventors: Richard Lee, Santa Clara; Daniel Prows, Los Gatos; Louis Fries, Los Altos, all of Calif.

[73] Assignee: Matrix Pharmaceutical, Inc., Fremont, Calif.

[21] Appl. No.: 742,677

[22] Filed: Oct. 31, 1996

[51] Int. Cl.[6] .................................. B01D 61/22; B01D 63/16
[52] U.S. Cl. ........................ 210/651; 210/784; 530/356; 530/414
[58] Field of Search .................................. 210/644, 645, 210/650, 651, 780, 784, 787, 321.63, 321.68, 321.87, 321.78; 530/356, 414

[56] References Cited

U.S. PATENT DOCUMENTS

| | | | |
|---|---|---|---|
| 4,790,942 | 12/1988 | Shmidt et al. | 210/650 |
| 4,867,878 | 9/1989 | Rashev | 210/363 |
| 4,876,013 | 10/1989 | Shmidt et al. | 210/650 |
| 4,894,441 | 1/1990 | Menicagli | 210/651 |
| 4,906,379 | 3/1990 | Hodgins et al. | 210/638 |
| 4,911,847 | 3/1990 | Shmidt et al. | 210/650 |
| 5,000,848 | 3/1991 | Hodgins et al. | 210/321.68 |
| 5,143,630 | 9/1992 | Rolchigo et al. | 210/780 |
| 5,194,145 | 3/1993 | Schoendorfer | 210/90 |
| 5,254,250 | 10/1993 | Rolchigo et al. | 201/321.67 |

OTHER PUBLICATIONS

Guideline on Sterile Drug Products Produced by Aseptic Processing, prepared by the Center for Drugs and Biologics and the Office of Regulatory Affairs, Food and Drug Administration (Jun., 1987), pp. 1–43.
Benchmark® Rotary Biofiltration System pamphlet, published by Membrex, Inc. (Aug., 1989), pp. 1–4.
Pacesetter Notes: Steam Sterilization of the Pacesetter Vortex Flow Filtration System pamphlet, published by Membrex, Inc. 1 page (undated).
SteelPore: Stainless Steel Membranes for VFF Systems pamplet, published by Membrex, Inc. 2 pages (undated).

Primary Examiner—Ernest G. Therkorn
Attorney, Agent, or Firm—Burns, Doane, Swecker & Mathis, L.L.P.

[57] ABSTRACT

A process for the aseptic concentration of collagen from about 0.25% (w/w) suspensions to gels of 15% using vortex flow filtration with a variety of membrane types—ultrafiltration and microfiltration and polymeric and stainless steel is provided. The resulting gels are suitable for use in medical products and/or pharmaceutical formulations. This process achieves high degree of concentration in a closed system and at high flux with minimal transmembrane pressure drop.

32 Claims, 3 Drawing Sheets

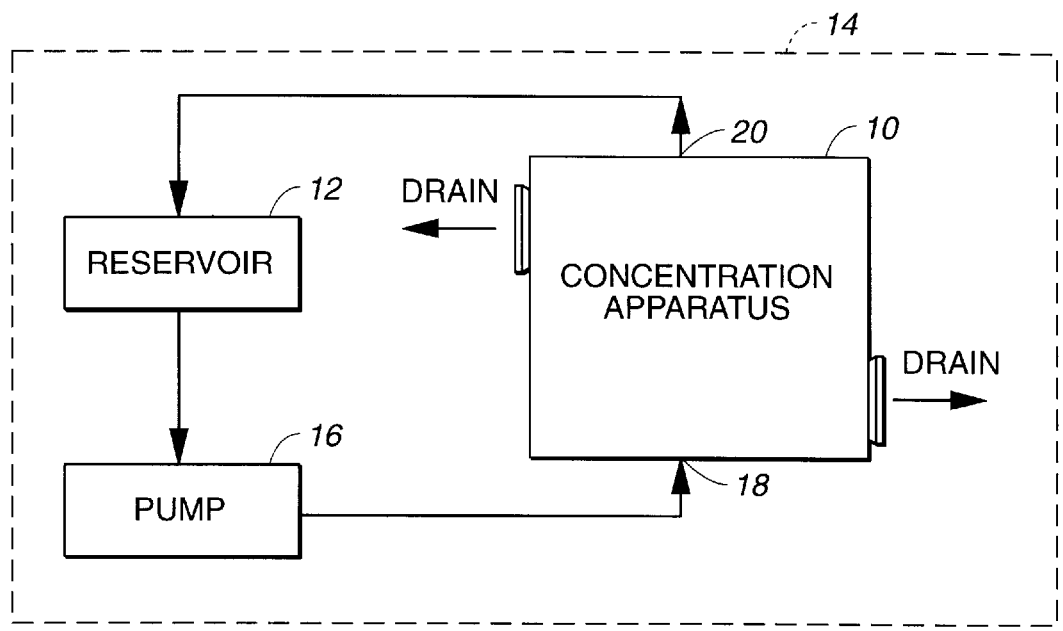
FIG._1
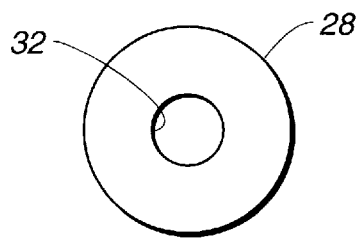
FIG._3
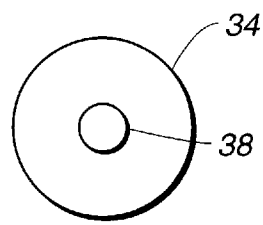
FIG._4
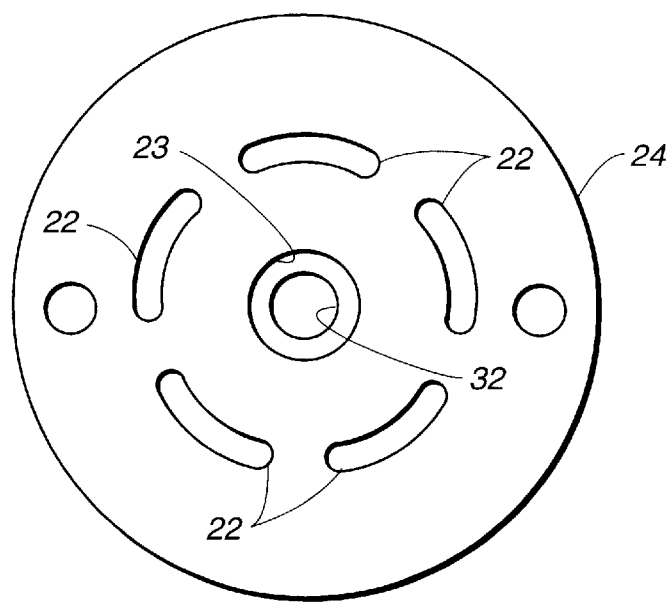
FIG._5

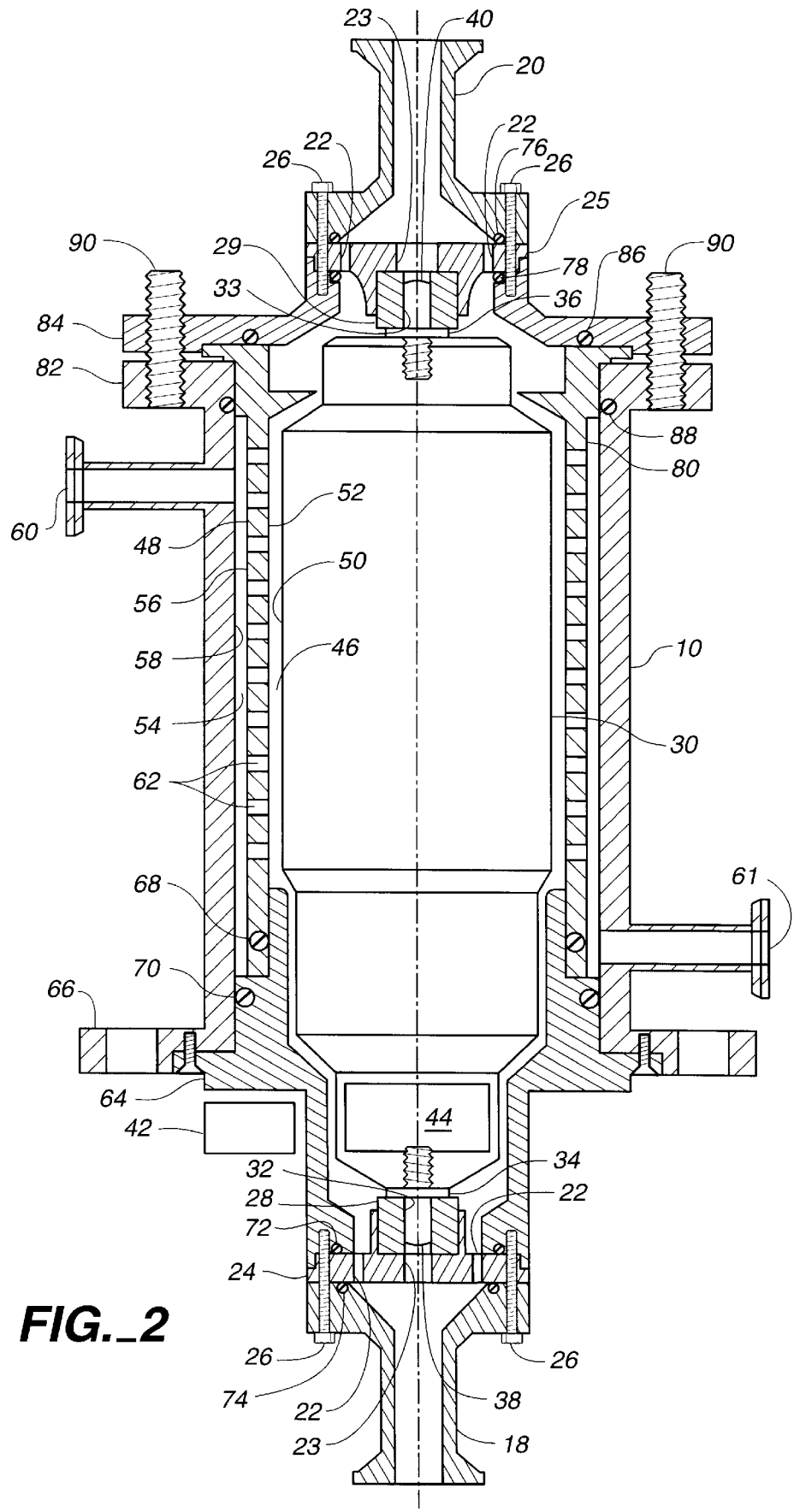
FIG._2

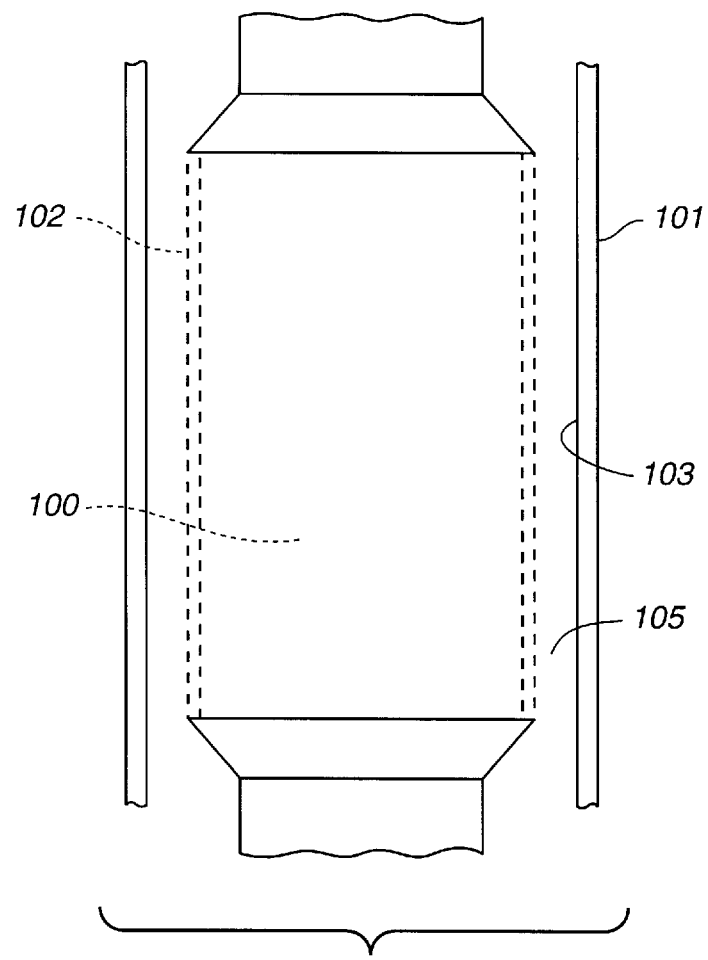
FIG._6

ASEPTIC COLLAGEN CONCENTRATION PROCESS

FIELD OF THE INVENTION

The invention relates generally to aseptic concentration of collagen compositions. Specifically, the invention relates to a process, which employs vortex flow filtration, that is capable of concentrating aqueous, free flowing collagen suspensions containing about 0.25% collagen by weight into viscous aqueous semisolids ("gels") having up to about 15% collagen. The sterile collagen preparation can be incorporated into parenteral, pharmaceutical, and biological formulations or medical devices.

BACKGROUND OF THE INVENTION

Collagen is the principal structural protein present in vertebrates. Natural collagen is readily available from a variety of domestic animals. The major portion of its structure varies little between mammalian species; and the positions of the distinguishing and structurally significant amino acid residues (glycine, proline, and hydroxyproline), are uniquely consistent in the main helical portion of the collagen.

Purified bovine collagen is used in a variety of medical devices including hemostats, sutures, corneal shields, and soft tissue augmentation. Collagen gels are often intermediates in the preparation of these devices and, in some cases, the gels represent the final medical products.

The term collagen usually implies the collagen present in skin, tendon, and bone. A number of different vertebrate collagens have been identified. All collagens contain a unique triple helix; however, the length of the helix and the nature and size of nonhelical portions of the molecule vary from type to type. The predominant collagen of skin, tendon, and bone is type-I collagen; type-II collagen is essentially unique to cartilage; and type-III collagen occurs in adult skin (5–10%) in association with type I and may be a minor contaminant of type I collagen prepared from this source. The other types occur in small amounts and are usually associated with specific biological structures.

The nonhelical terminal portions of the native collagen molecule, the telopeptides, extend as random coils from the amino and carboxy ends of the molecule. The telopeptide portions of the native collagen are believed to be the major sites of its immunogenicity. Therefore, in order to minimize the immunogenicity of the collagen to be used for the purposes indicated previously and subsequently elaborated upon, it is desirable that the telopeptides be removed. Atelopeptide collagen, or atelocollagen, refers to collagen wherein the telopeptides have been removed.

The term collagen is usually used generically and may apply to the molecule, the native fibril as it exists in situ or is reconstituted in vitro, one of several polymorphic aggregates, or simply to bulk material of unspecified structure. See, *Encyclopedia of Polymer Science and Engineering,* Vol. 3, 2nd Ed., (John Wiley & Sons, 1985).

Sterile bovine collagen compositions with concentrations up to 10% (w/w) and higher are commercially available. These formulations are prepared by conventional processes whereby collagen is precipitated from the solution and aseptically concentrated. A concentration/separation technique commonly employed in protein recovery is aseptic centrifugation, but this process can require high capital expenditure; moreover, centrifugation presents sterilization and validation challenges and may have product recovery problems, especially for viscous or adhesive materials. Other separation techniques have also been found to be unsatisfactory or difficult to operate in an aseptic manner. For example, dead end filtration and tangential flow filtration are not feasible because collagen tends to clog or blind the filters. Technical problems associated with concentrating collagen are attributable, in part, to the viscosity, adhesiveness and cohesiveness of aqueous collagen dispersions at relatively high concentrations (e.g., above about 2 to 3% w/w).

SUMMARY OF THE INVENTION

The present invention is directed to a separation process that employs a closed aseptic system for producing concentrated sterile compositions from dilute sterile suspensions or dispersions. The process is suited for concentrating protein suspensions, particularly collagen suspensions, that would ordinarily blind filters or semi-permeable membranes in prior art systems. The process can be employed in a batch, continuous, or semi-continuous mode and can be readily scaled-up to produce large quantities of concentrate.

In one method aspect, the invention is directed to a process for separating a collagen composition into a permeate portion and a concentrated retentate portion, which comprises the steps of:

(a) providing a vortex flow filtration device having an inlet and an outlet and which comprises:
  (i) an outer member having an inner surface;
  (ii) an inner member having an outer surface and mounted at least partially within the outer member to define a fluid gap between the inner surface of the outer member and the outer surface of the inner member, wherein the inlet is in fluid communication with the fluid gap;
  (iii) means for rotating the outer member or the inner member, or both, and
  (iv) filter means for filtering fluid in the fluid gap, the filter means located being located on the inner surface of the outer member or on the outer surface of the inner member or on both;

(b) causing the collagen composition to flow through the inlet and into the gap; and (c) rotating the rotor means at a speed effective to separate the collagen composition into permeate and concentrated retentate portions.

In another aspect, the invention is directed to process for producing a concentrated collagen composition from a dilute collagen suspension, which comprises the steps of:

(a) providing a vortex flow filtration device having an inlet and an outlet and which comprises:
  (i) an outer member having an inner surface;
  (ii) an inner member having an outer surface and mounted at least partially within the outer member to define a fluid gap between the inner surface of the outer member and the outer surface of the inner member, wherein the inlet is in fluid communication with the fluid gap;
  (iii) means for rotating the outer member or the inner member, or both, and
  (iv) filter means for filtering fluid in the fluid gap, the filter means located being located on the inner surface of the outer member or on the outer surface of the inner member or on both;

(b) causing the collagen suspension to flow through the inlet and into the gap;

(c) rotating the rotor means at speeds effective to separate the aqueous collagen suspension into a permeate and a retentate;

(d) recirculating at least a portion of the retentate back into the fluid gap for further separation into permeate and retentate; and (e) continuing steps (c) and (d) until the retentate has a collagen concentration of up to about 15% (w/w).

The process can be employed to produce sterile collagen compositions having about 0.25% to about 15% (w/w) collagen.

BRIEF DESCRIPTION OF THE DRAWINGS

FIG. 1 is a diagrammatical view of a system for aseptically filtering or concentrating a pharmaceutical or biological material in accordance with one embodiment of the present invention;

FIG. 2 is a sectional view of a vortex flow filtration/concentration apparatus in accordance with one embodiment of the present invention;

FIG. 3 is a top plan view of a spindle support in accordance with one embodiment of the present invention for use in the apparatus shown in FIG. 2;

FIG. 4 is a top plan view of a spindle in accordance with one embodiment of the present invention for use in the apparatus shown in FIG. 2; and FIG. 5 is a top plan view of a bearing support in accordance with one embodiment of the present invention for use in the apparatus shown in FIG. 2.

FIG. 6 is a sectional view of a vortex flow filtration/concentration apparatus in accordance with one embodiment of the present invention.

DESCRIPTION OF THE PREFERRED EMBODIMENTS

The present invention is based, in part, on the employment of vortex flow filtration to separate collagen suspensions to form highly concentrated, viscous compositions. The inventive process is capable of aseptically concentrating collagen dispersions without the fouling and other problems associated with prior art methods. Specifically, the inventive process can produce sterile collagen compositions having about 0.25% to about 12% collagen; it is expected the process can produce compositions having up to 15% collagen. (Except as specifically noted, all percentages referred to herein shall be on a weight basis.) The process can aseptically concentrate any type of collagen from any animal although the process will be described employing experimental data from bovine collagen. However, prior to describing this invention in further detail, the following terms will be defined.

The term "collagen" with respect to sterile collagen compositions prepared by the present invention shall include, but is not limited to, naturally occurring collagen and, more preferably, atelopeptide collagen derived by the removal of the nonhelical terminal portions of the native collagen molecule.

The term "collagen composition" generally refers to aqueous collagen formulations comprising up to about 15% collagen. Collagen compositions range from dilute solutions wherein the collagen molecules are solubilized, to thick, viscous semisolids ("gels"). The present invention can be employed to produce collagen compositions having up to about 15% collagen. It is understood that sterile collagen compositions produced by the present invention may contain buffering salts and other non-collagen solutes or suspended materials.

The viscosity of collagen composition will depend on a number of factors including collagen concentration, pH, temperature, salt content and the relative proportion of collagen monomers to oligomers present. The inventive process is capable of producing concentrations of 12% or more by weight which have corresponding viscosities of about 35,000 mPa·sec and higher. At ambient temperatures, collagen generally is soluble at about pH 2 as single molecules comprised of a triple helix and having a molecular weight of about 300 kDa. Small oligomers (e.g., dimers, trimers, etc.) are also soluble under these conditions. At pH of about 4.5 to 4.8 or above, the collagen molecules assemble into fibrils and/or large fibers that precipitate out of solution. Dispersions of fibrillar collagen generally exhibit pseudoplastic (or shear-thinning) behavior so that their viscosities decrease with increasing rate of shear. Preferably, the collagen compositions produced comprise about 3% to about 12% collagen, more preferably about 4% to about 10%, and most preferably about 6% to about 8%.

The term "collagen solution" generally refers to collagen compositions comprising about 0.1% to about 0.3% (wt) collagen wherein the collagen is solubilized; such compositions typically have viscosities ranging from about 5 mPa·sec to about 50 mPa·sec at ambient temperature. Collagen solutions are generally optically clear and freely flowable.

The term "collagen suspension" generally refers to collagen composition comprising about 0.1% to about 1% collagen wherein the collagen is only partially solubilized, i.e. a significant portion of the protein exists as solid-like particles (e.g. fibrils) dispersed in the liquid medium. These compositions are generally not optically clear.

The term "collagen gel" or "gel" generally refers to collagen compositions comprising about 1% to about 8% collagen and have viscosities ranging from about 1,000 mPa·sec to about 30,000 mPa·sec or higher. The consistency of the collagen gel can range from being partially free flowing to a viscous semisolid or paste. The gel comprises a mixture of solubilized collagen molecules and predominantly insoluble collagen solids (e.g., fibrils). It is understood that the terms "collagen solution", "collagen suspension" and "collagen gel" do not necessarily represent distinct forms of collagen compositions, but rather, they are convenient means for describing collagen compositions at different concentrations, pHs and/or temperatures.

The term "closed system" generally describes an apparatus that serves as a barrier between the product and the ambient environment. Once sterilized, a closed system is capable of aseptically processing materials such that the starting materials as well as the intermediate and final products remain sterile. Aseptic processing is used when the final product cannot be sterilized with heat, chemical agents, or other means. Aqueous collagen compositions are examples of such products. Closed systems provide additional assurance that the process can be conducted aseptically, and are therefore particularly well suited for aseptic processing of material like collagen solutions, suspensions, and gels.

The term "vortex flow filtration device" refers to an apparatus that has at least two members (at least one of which rotates) to define a filtration gap, means for effecting the rotation, and at least one filter facing the filtration gap. As used herein, "filter means" includes one or more filters and the term "filter" includes, for example, any filter, permeable or semi-permeable membrane or sieve, that can be utilized for "filtering" collagen. A "filter" may move (e.g., rotate) or be stationary in the device. One, two, or more filters may be used. For example, the device may have three concentric cylindrical members, with filters mounted on each, and one, two or all three of the members may rotate.

The vortex flow filtration device employs a filter comprising a semi-permeable membrane that preferably is essentially impermeable to fibrillar (insoluble) collagen. Preferably, the semi-permeable membrane has pore sizes ranging from 0.2 µm to 51 µm, and more preferably from 0.45 µm to 1.5 µm and most preferably 1 µm. The filters preferably are manufactured from materials that have low affinity for collagen, in order to reduce the tendency of blinding the device. Preferred materials include, for example, stainless steel and polysulfone. The vortex flow filtration device concentrates collagen by retaining the insoluble collagen (e.g., fibrils) while solvent and small molecules pass through the membrane as permeate.

The mechanism of the vortex flow filtration device is based, in part, on the hydrodynamic phenomenon known as Taylor vortices. These vortices help to prevent clogging or blinding of the filter. Filtration systems employing Taylor vortices are discussed in U.S. Pat. Nos. 4,790,942, 4,876,013, and 4,911,847 issued to Shmidt et al., which are incorporated herein by reference. These filtration systems use a membrane mounted on an inner body which rotates within a stationary outer body. Taylor vortices developed in the parent fluid in the annular gap between the inner body and the stationary outer body reduce clogging. For a theoretical discussion see U.S. Pat. No. 4,911,847.

The term "shed-resistant" refers to materials, especially those used for bearing surfaces, which do not produce particulates to the extent that product in contact with those materials is contaminated with those particulates. Acceptable levels of particulate matter in injections is discussed in USP XXIII <788>. Examples of shed-resistant materials include but are not limited to materials which will operate in continuous non-lubricated service with less than 500 microinches of wear at 10,000 PV for 40 hours where $$PV=speed(ft/min) \times load(psi)$$

and the mating surface is 316 stainless steel; continuous non-lubricated service with less than 400 microinches of wear at 10,000 PV for 40 hours where the mating surface is 1018 stainless steel; and/or continuous non-lubricated service with less than 350 microinches of wear at 10,000 PV for 40 hours where the mating surface is 303 stainless steel.

In addition, or in the alternative, to the requirements just discussed, the following procedure can be conducted to determine if a material is sufficiently shed-resistant.

Clean, pure, particulate-free water or product is recycled through the thoroughly clean system for the maximum proposed run time for the system. The water is then tested for particulates according to USP XXIII <788>.

Also see the procedures described in USP XXIII, <788> "Particulate Matter in Injections" which is incorporated herein by reference in its entirety.

CLASS VI MATERIAL - refers to materials classified as USP Class VI as defined in USP XXIII, <88> "Biological Reactivity Tests, In Vivo" which is incorporated herein by reference in its entirety.

The inventive method can be employed in a batch, continuous, or semi-continuous mode for concentrating collagen compositions. The inventive method is capable of filtering a dilute collagen suspension comprising from, for example, about 0.25% collagen to produce a viscous gel or semisolid mixture that comprises about 3% to about 15% collagen. It is understood that to produce a collagen composition of the desired concentration, the starting material can comprise any collagen composition of a lower concentration than that of the final product. Thus, for instance, to produce a viscous gel, the starting material can be a dilute collagen suspension or a less concentrated gel.

While the invention will be described herein employing one vortex flow filtration device, it is understood that multiple devices can be employed. The number of devices required will depend on a number of parameters, including the concentration of the collagen composition starting material, volume, the desired final concentration of the product, and process flow rate. The inventive process can comprise one or more vortex flow filtration devices employed in series, in parallel or combination thereof. For illustrative purposes, the process will be described herein to concentrate a collagen solution in a batch process wherein the solution is recirculated in a closed loop system to gradually raise its collagen concentration.

A preferred vortex flow filtration device is shown as apparatus 10 in FIGS. 1 and 2. Apparatus 10 can be used to concentrate collagen from 0.25% collagen to form gels having, for example, greater than 12% collagen. The apparatus concentrates collagen at a high flux rate through a membrane and with low transmembrane pressure by creating a three-dimensional flow profile, i.e., Taylor vortices, to keep the membrane surface from blinding.

In one embodiment of the vortex flow concentrating device of the present invention, the outer stationary cylinder is a permeable or semi-permeable membrane. The axially circumferential vortices that rotate in alternately opposing directions are formed between the rotating cylinder and the inside wall of the membrane. The strength of the vortices is directly proportional to the rotation rate of the rotating cylinder causing the maximum permeate flow to increase with rotor speed. Because there is a net axial velocity due to the feeding and removal of fluid into the device, the individual vortices assume what appears to be a helical shape and move from the inlet to the outlet of the device. The rotation of the individual vortices and the movement up the inside wall of the membrane continuously scours the inside of the membrane so that gels, particulates and colloids that would otherwise collect there are pulled back into the fluid. When the conditions for establishing the Taylor vortices are met, the filtration/concentration apparatus operates at very minimal transmembrane pressures (approximately less than 3 psi).

Apparatus 10 can be used in a sterile, closed loop system (14) such as shown in FIG. 1. System 14 is shown as one possible embodiment; other elements can be present, such as a heat exchanger on the return to the reservoir to remove heat generated by the rotating cylinder and the pump, or system 14 can be a subsystem of a larger system. A pharmaceutical or biological formulation, such as an aqueous dispersion of collagen, is placed in reservoir 12. The aqueous dispersion of collagen begins as a free flowing slurry or suspension with a concentration of approximately 0.25% and a viscosity of approximately 10 to 15 mPa·sec. The collagen dispersion is circulated through system 14 with pump 16. For example, pump 16 can be a low shear peristaltic pump or lobe pump. Pump 16 pushes the aqueous collagen dispersion into inlet 18. The aqueous collagen dispersion passes through apparatus 10 (as will be described in more detail later) and exits through outlet 20. Water and soluble components (permeate) pass through the semi-permeable membrane and are removed from one or both drains 60, 61. The collagen dispersion is then recirculated through system 14 with pump 16 until the desired concentration is achieved.

To better understand the novel features of the present invention, apparatus 10 will now be described in greater detail with respect to FIG. 2. Pump 16 pushes the aqueous pharmaceutical or biological material, such as a collagen dispersion, into inlet 18. The pharmaceutical or biological material enters inlet 18 and flows through openings 22 and center opening 23 in lower support 24. Lower support 24 and inlet 18 are attached to apparatus 10 by fasteners 26. As will be recognized by one of ordinary skill in the art other fasteners can be used. Fasteners 26 are advantageous, however, because they are removable which allows for ease in cleaning and sterilization as well as repair of the inlet, apparatus, and support. Lower support 24 holds lower spindle support 28. Lower spindle support 28 has an opening 32 for receiving lower spindle 34 of rotatable body or rotor 30. Opening 32 also allows the material flowing through center opening 23 to flow over the lower spindle 34 to help lubricate the surfaces on the lower spindle support 28 and lower spindle 34. Similarly, at the other end of apparatus 10, support 25 holds upper spindle support 29. Upper spindle support 29 has an opening 33 for receiving upper spindle 36 of rotatable body 30. Upper spindle support 29 is the same as lower spindle support 28. Upper spindle 36 and lower spindle 34 can be threaded and epoxied into rotatable body 30, be integrally formed with the rotatable body or attached by other known means.

In one embodiment, lower spindle support 28 in FIG. 2 and 3 is a bushing. Lower spindle pin 38 and upper spindle pin 40 are highly polished hard chrome plated 316 stainless steel or some equivalent. The pins 38, 40 should be corrosion resistant, smooth and have a very hard surface (e.g., having a hardness $R_c$, as measured by the Rockwell method, of greater than 60). Other materials include, but are not limited to, titanium nitride (TiN) coated titanium or TiN coated stainless steel. Lower spindle support 28 and upper spindle support 29 are constructed of a shed-resistant material. Preferably, the shed-resistant material has other characteristics such as remaining dimensionally stable after steam sterilization or autoclaving, having a low coefficient of friction so as to produce minimum resistance, and/or being a medical grade Class VI polymeric material. One such material is a specially formulated compound of virgin polytetrafluoroethylene and fillers (having Food and Drug Administration Master File Number MAF 288 and sold under the tradename RULON, available from Furon Dixon, 386 Metacom Ave., Bristol, RI 02809). This material has been found to be particularly advantageous because as the lower spindle and upper spindle rotate within the spindle supports this material does not shed or leave undesired particles in the material as it passes over the spindle pins. Conventional graphite bearings are typically unacceptable because they shed tiny black particles that discolor and/or contaminate the material being concentrated such that it can not be used for human injection.

In another embodiment, lower spindle pin 38 and upper spindle pin 40 are a shed-resistant material and the lower spindle support 28 and upper spindle support 29 are highly polished hard chrome plated 316 stainless steel or some equivalent. The supports 28, 29 should be corrosion resistant, smooth and have a very hard surface (e.g., $R_c > 60$). Other materials include, but are not limited to, TiN coated titanium or TiN coated stainless steel.

In either embodiment, it is preferable to have the semisolid or gel flow over the spindles and spindle supports so that each of these components remain relatively cool, lubricated, and there is no concern of a seal failing and exposing the semisolid or gel to undesirable contamination or discoloration by a non-shed resistant bearing. Important aspects of the present invention are the shed-resistant material used for the bearing interface, the ability to do aseptic processing for producing a human injectable product, and the ability to process semisolids or gels without clogging the system.

Rotatable body 30 is rotated by any number of means known by those of ordinary skill in the art. In the embodiment shown in FIG. 2, a magnetic drive coupling is used to rotate the rotatable body. A motor or power source (not shown) rotates the ring of magnets 42 located around the base of apparatus 10. Another magnet or set of magnets 44 are located in the base of rotatable body 30. As the ring of magnets 42 is rotated, the magnetic forces act on magnet 44 to cause the rotatable body to rotate. Preferably, the rotatable body is rotated in a range of 500 to 4000 rpm, more preferably in a range of 1000 to 3000 rpm, and most preferably at 1500 to 2000 rpm for a rotatable body diameter of 4 inches and an annular gap of $3/16$ inches. Vortex flow concentration principles scale up linearly in size, therefore one of ordinary skill in the art can determine the necessary dimensions of the elements of the apparatus for the particular desired processing rate using the equations discussed above.

As the rotatable body is rotated, pump 16 pushes the material through openings 22,23 adjacent to inlet 18, over bearing interface between lower spindle 34 and lower spindle support 28, and into annular gap 46 between outer side wall 50 of rotatable body 30 and the inner side wall 52 of membrane (or filter) 48. The material is separated at the interface with the membrane into a retentate that stays in annular gap 46 and a permeate, which is primarily water, soluble molecules, and small particles, that passes through the membrane. The permeate passes into annular space 54 located between outer side wall 56 of membrane 48 and inner side wall 58 of apparatus 10. The permeate can then be drained out of the apparatus through drains 60,61. There can be one or more drains and the drains can be located anywhere along the apparatus. In one embodiment, a slight positive pressure (approximately 2 to 4 psi) can be maintained on the permeate side to prevent pulling the permeate through the membrane and prevent membrane fouling.

The Taylor vortices discussed above are created in annular gap 46. The vortices act to prevent the openings 62 in membrane 48 from becoming clogged, blinded, fouled, etc. If the vortices were not present, a gel layer would begin to develop on the inner side wall of the membrane and decrease the flux through the membrane. The vortices allow liquids and small particles to pass through the membrane while pulling the gel or larger particles back away from the membrane openings. Each vortex acts as a whirlpool pulling particles and macromolecules away from the membrane surface. The result is that the material between the rotatable body and the membrane becomes more concentrated forming a gel or semisolid while maintaining stable permeate flow rates. The dispersion is circulated (or recirculated) through the apparatus over the bearing interface between upper spindle 36 and upper spindle support 29, through openings 22,33, and out through outlet 20. The dispersion is recirculated through system 14 as many times as required until the desired concentration is achieved. In order to adjust the size of annular gap 46 between inner side wall 52 of membrane 48 and outer side wall 50 of rotatable body 30, membranes of different inside diameters can be used or rotatable bodies of different outside diameters can be used in the apparatus.

Lower flange member 64 is sized to create a tight friction fit with the bottom of apparatus 10 and, in one embodiment includes O-ring 70 to prevent leakage. In another embodiment, lower flange member 64 is integral with flange 66 around the base of apparatus 10. Membrane 48 is sized to create a tight friction fit with inner side wall 58 around the base of apparatus 10 and, in one embodiment includes O-ring 68 to prevent leakage. O-rings 72 and 74 can also be provided to prevent leakage around lower support 24. O-rings 76 and 78 can also be provided to prevent leakage around upper support 25. At all locations where O-rings are used, it is preferable to round off the edges of the O-ring seat so that the O-ring is not pinched when the two parts are mated. The pinching of the O-ring can result in parts of the O-ring skiving off and discoloring and/or contaminating the pharmaceutical or biological material. Preferably, the O-rings are made of medical grade elastomer.

In one embodiment, upper flange 80 around the top of membrane 48 is sized to fit between flange 82 around the top of apparatus 10 and upper flange member 84 with O-rings 86 and 88 provided to prevent leakage. Fasteners 90 are used to create a tight fit between flange 82 and upper flange 80, and between upper flange 80 and upper flange member 84. Fasteners such as shown in FIG. 2 are advantageous because the bolt is integrally attached to flange 82 and the nut simply has to be removed for disassembling, cleaning, sterilizing, servicing, etc. the apparatus. As one of ordinary skill in the art will recognize other means can be used in place of fasteners 90, such as clamps, twist-locks, threaded fittings, etc. Likewise, upper flange 80 of membrane 48 does not have to extend between upper flange member 84 and flange 82. It can fit within the inner wall of the apparatus such that upper flange member 84 and flange 82 mate face to face as is shown at the base of the membrane in FIG. 2. Upper support 25 and outlet 20 are attached to upper flange member 84 by fasteners 26. As will be recognized by one of ordinary skill in the art other fasteners can be used. Fasteners 26 are advantageous, however, because they are removable which allows for ease in cleaning and sterilization as well as repair of the inlet, apparatus, and support.

The apparatus has been described with respect to upper and lower components; however, the apparatus is not limited to a vertical orientation. Because of the forces involved during operation, the apparatus can be operated horizontally or on an incline as well. In addition, the rotatable body and the membrane do not both have to be cylinders. One or both could be a cone, for example.

As can best be seen in FIG. 5, lower support 24 (likewise, upper support 25) has elongated openings 22 spaced angularly around the center opening. The elongated openings are particularly advantageous because they allow the semisolid or gel to pass through more easily than smaller, circular openings. The elongated openings prevent clogging, help to decrease pressure differentials and increase the flow rate. Other configurations of enlarged openings are beneficial as well. Inlet 18 and outlet 20 are of large inner diameter and straight without any bends or elbows for the same reasons and to aid also in aseptic assembly of the apparatus. Preferably, all of the parts previously described, except for the magnets, lower spindle support, upper spindle support and the O-rings, are made from 316 L stainless steel (polished to a 32 RMS finish) for ease in cleaning and sterilization, or some equivalent.

Membrane or filter 48 can be made from many different materials and have various pore sizes. The membranes can be described as permeable or semi-permeable. Stainless steel membranes ranging from those manufactured from sintered steel powder with a pore rating of 0.2 $\mu$m up to those manufactured from sintered steel powder or steel fibers with 1, 3, 5, 10, 20, 50 and 100 $\mu$m pore ratings can be used. Stainless steel screens with pore sizes of 20 to 200 $\mu$m can also be used. The advantage of steel membranes is that they can be cleaned with a wide array of agents, including caustics, and they can withstand exposure to repeated steam sterilization cycles. Hydrophilic polymeric ultrafilters and microfilters made from polysulfone or a cross-linked polyacrylonitrile polymer in pore sizes ranging from 10kD to 0.2 $\mu$m can also be used. The preferred membrane pore size is dependent on the particle or fiber size of the material to be concentrated. In the case of collagen, 0.21 $\mu$m to 5 $\mu$m is preferred, more preferably 1–3 $\mu$m. A related co-pending application which further describes the vortex flow filtration device, is Serial No. 08/742,058 filed on Oct. 31, 1996, entitled Apparatus For Aseptic Vortex Flow Concentration" which application is incorporated herein.

The device illustrated in FIGS. 1 through 5 employs a rotating body housed within an outer stationary cylinder that is a permeable or semi-permeable membrane. Vortex flow filtration devices suitable for the present invention may also comprise devices, for instance, wherein the membrane is mounted on an inner body which rotates within a stationary outer body. See, for instance, U.S. Pat. Nos. 4,790,942, 4,876,013, and 4,911,847. In these devices, Taylor vortices developed in the parent fluid in the annular gap between the inner body and the stationary outer body reduces blinding. As shown in FIG. 6, which is a partial sectional view of such a device, an inner, rotatable body 100 comprising a permeable or semi-permeable membrane 102, is positioned within an outer stationary 101 body having an inner side wall 103. The inner body has an outer side wall spaced from the inner side wall of the stationary body which define an annular gap 105 which is in communication with the devices inlet.

In operation, as the inner rotatable body is rotated, material is pumped into the annual gap. The inner rotatable body with the membrane is rotated at a sufficient rate to produce Taylor vortices in the annular space so as to cause permeate to flow into the inner region of the inner body, while the retentate remains in the annular gap.

As is apparent, for vortex flow filtration device employed in the inventive process, the speed of rotation of the rotatable body and the width of the annular gap are two parameters that can be optimized. Other parameters include permeate rates, retentate recirculation rates, and transmembrane pressures.

Experimental

Experiments were conducted which demonstrated the feasibility of employing vortex flow filtration devices to concentrate collagen compositions. The filtration system used was that shown in FIGS. 1–5. Specifically, the vortex flow filtration devices employed were a Membrex Mini-Pacesetter™ (Examples 1–2) and Membrex PaceSetter™ (Example 3) both from Membrex, Inc. Fairfield, N.J. The membranes used were also available from Membrex, Inc. The devices were modified so that the lower spindle support and upper spindle support are constructed of RULON™, as described above. The collagen compositions tested were prepared from a 0.30% (w/w) bovine collagen solution (pH 2). Collagen was caused to precipitate by the addition sufficient amounts of 0.2M sodium phosphate buffer solution (pH 11) to form a collagen suspension containing about 0.27% collagen at about pH 7. As shown in Examples 1, 2, and 3, this 0.27% collagen composition was concentrated to 8.1%, 8.5% and 7.6% collagen gels, respectively.

EXAMPLE 1

A collagen suspension comprising 0.27% collagen (about pH 7) and having the consistency of a thin, readily flowable slurry was concentrated by vortex flow filtration using a 400 cm² 1 µm stainless steel membrane. Taylor vortices are created in the annular gap by the rotor (or rotatable body) spinning at 1500 rpm inside the cylindrical membrane. Product was recirculated through the system at approximately 2 L/min and heat from the rotor and the pump was removed by a heat exchanger on the return to the reservoir feed tank. Permeate was collected through the membrane which retained the collagen suspension. The permeate flow rate was controlled by a peristaltic pump to maintain a low transmembrane pressure. A slight positive pressure, about 2–4 psi, was maintained on the permeate side of the membrane to avoid pulling the permeate through the membrane and resultant membrane fouling. 39 kg of collagen suspension were concentrated from an 0.27% suspension to an 8.1% gel at a rate of 300 mL/min. The flux for the last 3 liters declined to about 150 mL/min. Total concentration time was 2.5 hours. The final concentrate was recovered from the system by pumping the gel and then blowing the residual out with nitrogen. Alternatively the residual concentrate can be rinsed out with water or buffer solutions.

EXAMPLE 2

A collagen suspension comprising 0.27% collagen (about pH 7) and having the consistency of a thin, readily flowable slurry was concentrated by vortex flow filtration using a 400 cm² 1-µm stainless steel membrane. Taylor vortices are created in the annular gap by the rotor (or rotatable body) spinning at 1500 rpm inside the cylindrical membrane. Product was recirculated through the system at approximately 2 L/min and heat from the rotor and the pump was removed by a heat exchanger on the return to the reservoir feed tank. Permeate was collected through the membrane which retained the collagen suspension. The permeate flow rate was controlled by a peristaltic pump to maintain a low transmembrane pressure. A slight positive pressure, about 2 to 4 psi, was maintained on the permeate side of the membrane for the majority of the run to avoid pulling the permeate through the membrane and resultant membrane fouling. 82 kg of collagen suspension were concentrated from an 0.27% suspension to an 8.5% collagen gel at a rate of 0.3 L/min. Total concentration time was 4 hours and 39 minutes. The final concentrate was recovered from the system by displacing the gel with nitrogen at 15 psi pressure.

EXAMPLE 3

A collagen suspension comprising 0.27% collagen (about pH 7) and having the consistency of a thin, readily flowable slurry was concentrated by vortex flow filtration using a 2300 cm² 1-µm stainless steel membrane. Taylor vortices are created in the annular gap by the rotor (or rotatable body) spinning at 1800 rpm inside the cylindrical membrane. Product was recirculated through the system at approximately 11 L/min and heat from the rotor and the pump was removed by a heat exchanger on the return to the reservoir feed tank. The permeate flow rate was controlled by a peristaltic pump to maintain a low transmembrane pressure. A slight positive pressure, about 2 to 4 psi was maintained on the permeate side of the membrane for the majority of the run to avoid pulling the permeate through the membrane and resultant membrane fouling. 76 kg of collagen suspension were concentrated from an 0.27% suspension to a 7.6% gel at a rate of 1.3 L/min. The flux for the last 6 liters declined to between 0.2 to 0.8 L/min. Total concentration time was 75 minutes. The final concentrate was recovered from the system by displacing the gel with air at 15 psi pressure.

Aside from the vortex flow filtration device described above, it is expected that the inventive process of separating a collagen composition into a permeate portion and a concentrated retentate portion can also be accomplished with a technique called vibratory shear enhanced processing (VSEP) which is described in Culkin & Armando, *Filtration & Separation*, September/October 1992 pp. 376–378 which is incorporated herein. In a vibratory shear enhanced processing system the feed slurry remains nearly stationary, moving in a leisurely meandering flow between parallel membrane leaf elements. The leaf elements move in a vigorous vibratory motion tangential to the face of the membranes. The shear waves produced by the membrane's vibration cause solids and foulants to be repelled, and liquid to flow to the membrane pores unhindered.

In an industrial VSEP machine, the membrane leaf elements are arrayed as parallel discs separated by gaskets. The disc "stack" is spun at high speed in a torsional oscillation (a rim peak displacement of 1.5 inches at 60 Hz). This produces a shear rate at the membrane/liquid interface of about 150,000 inverse seconds. Devices which employ the vibratory shear enhanced process technique are available from Pall Separator Co., Emeryville, Calif.

Another apparatus which may be applicable is called the high shear dynamic membrane system. In this system, the filter membrane device works on the principle of creating high shear forces at the membrane surface which tend to lift contaminants away and prevent their penetrating the filter medium.

Shear is created in the gap between rotating solid disc and the stationary membrane surface. The competition between dynamic and viscous forces in the fluid results in rotation of the bulk of the fluid as a nearly rigid disc with significant shear in the boundary layer formed on the membrane surface and on the rotating solid disc. The shear resulting from the rotating disc minimizes concentration polarization and minimizes buildup of a gel layer and concomitant rapid decrease in permeate flux, as occurs with conventional cross flow filtration. In addition, the gel layer itself can act as an extremely fine filter, resulting in loss of collagen. The ability to achieve high flux without gel layer buildup is a direct result of decoupling the shear rate from the cross flow velocity. Devices which employ high shear dynamic membrane systems are available from Pall Ultrafine Filtration Co., East Hills, N.Y.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A process for separating a collagen composition into a permeate portion and a concentrated retentate portion, which comprises the steps of:
    (a) providing a vortex flow filtration device having an inlet and an outlet and which comprises:
        (i) an outer member having an inner surface;
        (ii) an inner member having an outer surface and mounted at least partially within the outer member to define a fluid gap between the inner surface of the outer member and the outer surface of the inner member, wherein the inlet is in fluid communication with the fluid gap;
        (iii) means for rotating the outer member or the inner member, or both, and (iv) filter means for filtering fluid in the fluid gap, the filter means located being located on the inner surface of the outer member or on the outer surface of the inner member or on both;

(b) causing the collagen composition to flow through the inlet and into the gap; and (c) rotating the rotor means at a speed effective to separate the collagen composition into a permeate and a concentrated retentate wherein the concentrated retentate has a collagen concentration of at least about 3% (w/w).

2. The process of claim 1 further comprising the steps of withdrawing the permeate during rotation of the rotor means and withdrawing the concentrated retentate during rotation of the rotor means.

3. The process of claim 1 wherein the filter means is located on the inner surface of the outer member.

4. The process of claim 1 wherein the filter means is located on the outer surface of the inner member.

5. The process of claim 1 wherein the filter is mounted on the outer wall of the rotor member.

6. The process of claim 1 wherein the rotor means is rotated at between about 1000 and about 3000 rpm.

7. The process of claim 1 wherein the concentrated retentate comprises about 3.0% (w/w) to about 15% (w/w) collagen.

8. The process of claim 1 wherein the concentrated retentate comprises about 6% (w/w) to about 8% (w/w) collagen.

9. The process of claim 1 wherein the retentate is recirculated into the inlet to produce a higher concentrated retentate.

10. The process of claim 9 wherein the concentrated retentate comprises about 4% (w/w) to about 15% (w/w) collagen.

11. The process of claim 9 wherein the concentrated retentate comprises about 6% (w/w) to about 8% (w/w) collagen.

12. The process of claim 1 wherein the concentrated retentate has a collagen concentration of between about 4% (w/w) to about 15% (w/w) collagen.

13. A process for separating a fibrillar collagen composition into a permeate portion and a concentrated fibrillar collagen retentate portion, which comprises the steps of;

(a) providing a vortex flow filtration device having an inlet and an outlet and which comprises:
  (i) an outer member having an inner surface;
  (ii) an inner member having an outer surface and mounted at least partially within the outer member to define a fluid gap between the inner surface of the outer member and the outer surface of the inner member, wherein the inlet is in fluid communication with the fluid gap;
  (iii) means for rotating the outer member or the inner member, or both, and
  (iv) filter means for filtering fluid in the fluid gap, the filter means being located on the inner surface of the outer member or on the outer surface of the inner member or on both, wherein the filter means has pore sizes ranging from about $0.2\mu$ to $5\mu$;

(b) causing the collagen fibrillar composition to flow through the inlet and into the gap; and (c) rotating the rotor means at a speed effective to separate the collagen fibrillar composition into a permeate and a concentrated fibrillar collagen retentate wherein the concentrated fibrillar collagen retentate has a collagen concentration of at least about 0.3% (w/w).

14. The process of claim 13 further comprising the steps of withdrawing the permeate during rotation of the rotor means and withdrawing the concentrated fibrillar collagen retentate during rotation of the rotor means.

15. The process of claim 13 wherein the filter means is located on the inner surface of the outer member.

16. The process of claim 13 wherein the filter means is located on the outer surface of the inner member.

17. The process of claim 13 wherein the filter is mounted on the outer wall of the rotor member.

18. The process of claim 13 wherein the rotor means is rotated at between about 1000 and about 3000 rpm.

19. The process of claim 13 wherein the concentrated fibrillar collagen retentate comprises about 0.3% (w/w) to about 15% (w/w) collagen.

20. The process of claim 13 wherein the concentrated fibrillar collagen retentate comprises about 0.3% (w/w) to about 8% (w/w) collagen.

21. The process of claim 13 wherein the retentate is recirculated into the inlet to produce a higher concentrated fibrillar collagen retentate.

22. The process of claim 21 wherein the concentrated fibrillar collagen retentate comprises about 0.3% (w/w) to about 15% (w/w) collagen.

23. The process of claim 21 wherein the concentrated fibrillar collagen retentate comprises about 3% (w/w) to about 8% (w/w) collagen.

24. A process for producing a concentrated fibrillar collagen composition from a fibrillar collagen suspension, which comprises the steps of:

(a) providing a vortex flow filtration device having an inlet and an outlet and which comprises:
  (i) an outer member having an inner surface;
  (ii) an inner member having an outer surface and mounted at least partially within the outer member to define a fluid gap between the inner surface of the outer member and the outer surface of the inner member, wherein the inlet is in fluid communication with the fluid gap;
  (iii) means for rotating the outer member or the inner member, or both, and
  (iv) filter means for filtering fluid in the fluid gap, the filter means being located on the inner surface of the outer member or on the outer surface of the inner member or on both, wherein the filter means has a pore size of $0.2\mu$ to $5\mu$;

(b) causing the fibrillar collagen suspension to flow through the inlet and into the gap;

(c) rotating the rotor means at speeds effective to separate the fibrillar collagen suspension into a permeate and a retentate;

(d) recirculating at least a portion of the retentate into the fluid gap for further separation into permeate and retentate; and (e) continuing steps (c) and (d) until the retentate has a fibrillar collagen concentration of between about 0.3% (w/w) to about 15% (w/w).

25. The process of claim 24 further comprising the steps of withdrawing the permeate during rotation of the rotor means and withdrawing the concentrated retentate during rotation of the rotor means.

26. The process of claim 25 wherein the filter means is located being located on the inner surface of the outer member.

27. The process of claim 25 wherein the filter means is located being located on the outer surface of the inner member.

28. The process of claim 25 wherein the filter is mounted on the outer wall of the rotor means.

29. The process of claim 25 wherein the concentrated retentate comprises about 6% (w/w) to 8% (w/w) collagen.

30. The process of claim 24 wherein the rotor means is rotated at between about 1000 and about 3000 rpm.

31. The process of claim 24 wherein the concentrated retentate comprises about 0.3% (w/w) to about 15% (w/w) collagen.

32. The process of claim 24 wherein the concentrated retentate comprises about 3% (w/w) to 8% (w/w) collagen.

* * * * *